Figure 1:
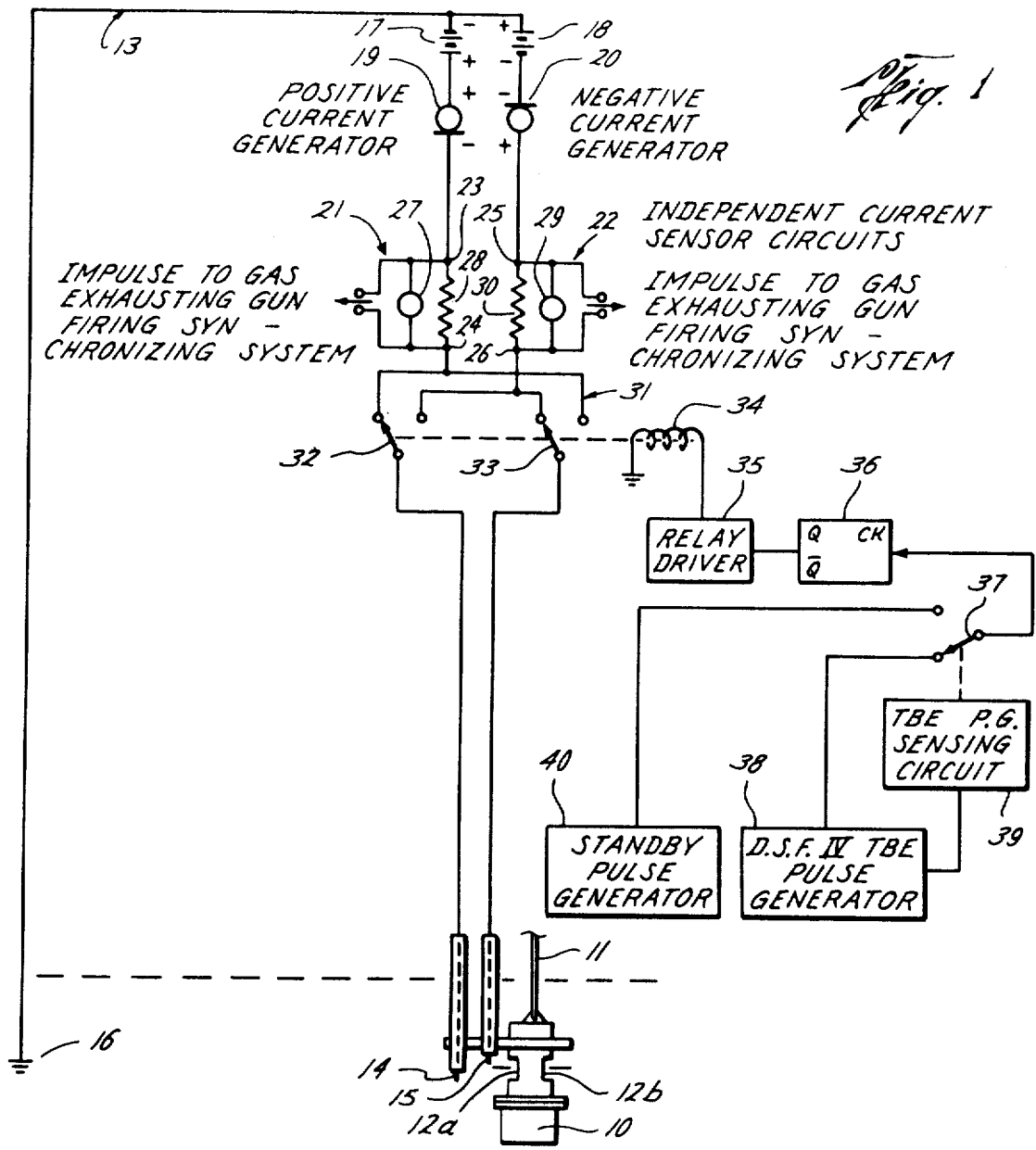

United States Patent [19]

Elliott, Jr. et al.

[11] 4,405,033
[45] * Sep. 20, 1983

[54] FAIL-SAFE METHODS FOR GENERATING A PULSE INDICATING THE PRECISE MOMENT OF FIRING OF A GAS EXHAUSTING GUN

[75] Inventors: Lloyd E. Elliott, Jr.; John L. Hudson, both of Houston, Tex.

[73] Assignee: Texaco Inc., White Plains, N.Y.

[*] Notice: The portion of the term of this patent subsequent to Jan. 6, 1998, has been disclaimed.

[21] Appl. No.: 228,432

[22] Filed: Jan. 26, 1981

Related U.S. Application Data

[63] Continuation-in-part of Ser. No. 90,158, Oct. 31, 1979, abandoned, which is a continuation-in-part of Ser. No. 913,772, Jun. 8, 1978, abandoned.

[51] Int. Cl.³ .................. G01V 1/38; G01V 1/14
[52] U.S. Cl. .................... 181/120; 181/118; 367/144
[58] Field of Search ............ 181/107, 110, 118, 120; 367/144; 73/304 R; 340/852

[56] References Cited

U.S. PATENT DOCUMENTS

| | | | |
|---|---|---|---|
| 1,212,438 | 1/1917 | Bauder | 73/304 R |
| 3,206,615 | 9/1965 | La Pointe | 73/304 R |
| 3,503,861 | 3/1970 | Volpe | 204/195 P |
| 3,840,439 | 10/1974 | Marsh | 204/195 C |
| 4,106,585 | 8/1978 | Huizer | 181/107 |
| 4,110,740 | 8/1978 | Akita et al. | 73/304 R |
| 4,141,431 | 2/1979 | Baird | 181/118 |
| 4,165,509 | 8/1979 | Betts et al. | 73/304 R |

*Primary Examiner*—Richard A. Farley
*Attorney, Agent, or Firm*—Robert A. Kulason; Jack H. Park; Henry C. Dearborn

[57] ABSTRACT

New methods are disclosed for detecting the instant of firing of a gas exhausting gun such as an air gun which reduce plating action on two closely spaced apart electrodes submerged underwater very close to the gas exhausting gun exhaust comprising the basic steps of passing a current through the two electrodes, and periodically reversing the current to the two electrodes responsive to a polarity reversing circuit means after (1) a predetermined period of time or (2) after each firing of the gas exhausting gun.

Likewise new methods for forming and assembling a fail-safe gas exhausting gun firing detection circuit are set forth in detail.

14 Claims, 2 Drawing Figures

IMPULSES TO GAS EXHAUSTING OR AIRGUN
FIRING SYNCHRONIZING SYSTEM

FAIL-SAFE METHODS FOR GENERATING A PULSE INDICATING THE PRECISE MOMENT OF FIRING OF A GAS EXHAUSTING GUN

BACKGROUND OF THE INVENTION

This is a continuation-In-Part of Ser. No. 90,158, filed Oct. 31, 1979, now abandoned which is a continuation-in-part of Ser. No. 913,772, filed June 8, 1978, now abandoned.

Marine seismic operations utilizing multiple gas exhausting guns, as an air gun, for example, require means for precisely synchronizing the release of energy from each gun in order to optimize the composite acoustic pulse. A primary requirement of any synchronizing control system is means for detecting the exact time at which gas is released from each gun for forming a seismic acoustical energy pulse.

In marine seismic survey operations, the high pressures and adverse mechanical operating conditions prevailing in the proximity of gas exhausting gun energy sources greatly reduce the reliability of conventional transducers such as hydrophones, accelerometers or pressure detecting devices which might be employed to detect the instant of energy release for recording on the seismic record, such as the acoustical to electrical converter disclosed in U.S. Pat. No. 3,496,532.

We have invented a practical and reliable method for detecting the time gas is released from the gun or the instantaneous beginning of the seismic energy pulse, and a method for forming and assembling a fail-safe gas exhausting gun firing detection circuit.

The electrical event which results from circuitry arranged to detect this instant and momentary change of resistance is essentially free from uncertainty and mechanical noise which normally affects conventional transducers.

Conventional air guns used as a submerged seismic energy source are illustrated in U.S. Pat. Nos. 3,379,273, 3,653,460, 3,923,122 and 4,141,431. Likewise, in a typical synchronized seismic exploration system as illustrated in U.S. Pat. No. 3,496,532, a seismic streamer cable is towed through the water to detect the acoustic reflection waves in the water generated by the detonation of the charge and to convert them into corresponding electrical signals for the recording and processing apparatus. Thus, in the present day equipment, the time lost, as the few milliseconds travel time through the water between the gas exhausting gun and the weaving towed sound detector a few yards or meters away has to be tolerated. Since typical velocity of sound in water is 5,000 ft./sec., the travel time to a detector towed, say 10 feet away from a gas exhausting gun, would be 2 milliseconds, which is too great an error to enable the precise synchronization required in seismic recording operations.

In systems like that disclosed in U.S. Pat. No. 4,141,431, plating takes place on one of the electrodes after several firings of the air gun, and cross coupling results between channels. Also, a fail-safe system is lacking in the above patent as well as in most other systems since if either electrode became defective, the system would fail to operate.

OBJECTS OF THE INVENTION

Accordingly, a primary object of this invention is to provide a fail-safe method of gas exhausting gun firing detection that operates when either one of the two electrodes becomes defective.

Another primary object of this invention is to provide a method of forming and assembling a fail-safe gas exhausting gun firing detection system that reduces the plating action on the electrodes and for reducing cross coupling between other channels.

A further object of this invention is to provide a fail-safe method for indicating the precise moment of firing of a gas exhausting gun and methods for forming a gas exhausting gun firing detection systems that are easy to operate, comprise simple steps, are economical to carry out, and are more effective for producing the exact time of firing of the gas exhausting gun for extreme accuracy of synchronization in the seismic record and for forming and assembling a gas exhausting gun firing detection system.

Other objects and various advantages of the disclosed fail-safe method for detecting the precise moment of firing of a gas exhausting gun and method for assembling a gas exhausting gun firing detection system will be apparent from the following detailed description, together with the accompanying drawing, submitted for purposes of illustration only and not intended to define the scope of the invention, reference being made for that purpose to the subjoined claims.

DESCRIPTION OF THE INVENTIONS

These inventions disclosed herein comprise methods for assembling and forming a mechanism for generating a pulse indicating the precise moment of firing of a gas exhausting gun, and methods for generating a pulse indicating the precise moment of firing of a submerged gas exhausting gun for a seismic record.

DESCRIPTION OF GAS EXHAUSTING GUN FIRING DETECTOR BRIEF DESCRIPTION OF THE DRAWINGS

Figure 2:
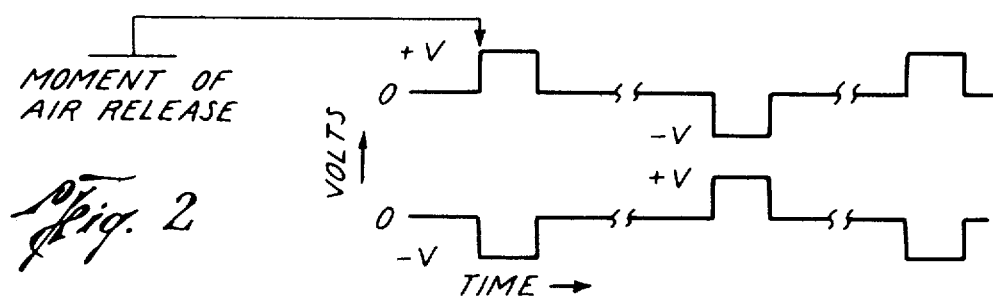

The drawing diagrammatically illustrates by way of example, not by way of limitation, one form of the invention wherein like reference numerals designate corresponding parts in the several views in which:

FIG. 1 is a schematic diagrammatic elevation view of the complete mechanism including the novel circuitry; and FIG. 2 is a time versus voltage output curve of the disclosed system.

The invention disclosed herein, the scope of which being defined in the appended claims is not limited in its application to the details of construction and arrangement of parts shown and described, since the invention is capable of other embodiments and of being practiced or carried out in various other ways. Also, it is to be understood that the phraseology or terminology employed here is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

FIG. 1 illustrates a seismic gas exhausting gun, as an explosive gun or a pnuematic energy source, such as but not limited to, a submerged air gun 10 supported with a line 11 from a boat (not shown) above. This seismic energy source also may be any one of various other gas exhausting guns, as a gas exploder that discharges a gas or air bubbles at a controlled location. The gas exhausting gun 10 has exhaust ports 12a and 12b. While various gas exhausting guns and circuits may be utilized with the new concept disclosed hereinafter, only one gas exhausting gun and one circuit therefor is disclosed for clarity of disclosure in the delineation of the sedimentary section below.

The gun 10 may be any type that when fired underwater, the expulsion or replacement of water is done by a medium having a conductivity different from that of water.

Since this medium is usually a gas resulting from an explosion or implosion, the term "gas exhausting gun" is intended to cover all mediums other than water resulting from a seismic energy source. Even a vacuum cavitation left behind a mass moving very rapidly through the water generates a vapor which is thus similar to the implosion of an air gun which is a gas exhausting gun.

There is a proliferating spectrum of seismic energy sources including explosives as dynamite, black powder, gun power, ammonium nitrate, AQUAFLEX*, AQUASEIS*, FLEXOTIR*, and PRIMACORD*, electric sparkers as BOOMERS*, PINGERS*, SONOPROBE*, SSP*, and WASSP*, gas exploders as AQUAPULSE*, DINOSEIS*, DUSS*, and GASSP*, air guns as AIRDOX*, CARDOX*, HYDRO-SEIN*, PAR*, PNEUMATIC ACOUSTIC ENERGY SOURCE*, and SEISMOSET*, etc., in addition to cracklers, magnetohydrodyuamic bangers, poppers, slappers, snappers, snappers, water hammers, and the underwater chirper system, VIBROSEIS*. Because of various economic, technological, ecological, and political reasons, the air gun type of alternative energy source is the most prevalent at this time.

*NAMES AND TRADE-MARKS

AIRDOX—Trademark of Long-Airdox Company, Oak Hill, West Virginia.

AQUAFLEX—Trademark of Imperial Chemical Industries, Ltd., High Energy "Seismic Cord" for Linear Sources.

AQUAPULSE—Trademark and Service Mark of Western Geophysical Company of America, 8100 Westpark Drive, Houston, Tex. 77042. Licensee of Esso Production Research Company.

AQUASEIS—Name of Linear Energy Source. Imperial Chemical Industries, Ltd., Nobel Division, Stevenson, Ayrshire, Scotland.

BOOMER—Trademark of EG&G International, 95 Brookline Avenue, Boston, Mass. 02215.

CARDOX—Trademark of Long-Airdox Company.

DINOSEIS—Registered Trademark of Sinclair Research, Inc., Gas Exploder Sound Source.

DUSS—Trademark of Mobil Oil Company Corporation Diesel Underwater Seismic Source.

FLEXOTIR—Trademark of Institut Francais du Petrole, Sound Source licensed by Chevron Research & Development.

GASSP—Trademark of Shell Development Company, Gas Source Seismic Profiler, Licenses to Teledyne Exploration, 3401 Shiloh Road, Garland, Tex.

HYDRO-SEIN—Originally the Trademark of Marine Geophysical Serives—Now a part of Western Geophysical Company of America, Implosive Sound Source.

PAR—Trademark of Bolt Associates, Inc., Pneumatic Sound Source System, 10 Fitch Street, Norwalk, Conn. 06855.

PINGER—Manufactured by EG&G International.

PNEUMATIC ACOUSTIC ENERGY SOURCE—Geophysical Service, Inc., Science Services Division, Texas Instruments, Inc. Name of Air Gun System, Texas Instruments, Inc., 6000 Lemmon Avenue, Dallas, Tex. 75222.

PRIMACORD—Trademark of Ensign-Bickford Company, Simsbury, Conn.

SEISMOJET—High Pressure Air Gun of Trojan-U.S. Powder, Manufactured and Distributed by SIE-Dresser Systems, 10201 Westheimer, Houston, Tex. 77001.

SONO-PROBE—Trademark of Mobil Oil Corporation.

SPARKARRAY—Trademark of EG&G International.

SSP—Trademark of Teledyne Exploration, A Teledyne Company, Seismic Section Profiler System.

VIBROSEIS—Trademark and Service Mark of Continental Oil Company, Continuous Sound Source.

WASSP—Trademark of Teledyne Exploration. A Teledyne Company, Wire Arc Seismic Section Profiler System.

FIG. 1 also illustrates the novel circuit 13 for powering the two electrodes 14 and 15. This new circuit comprises a sea ground 16, having a direct current electrical source 17 and 18, and a positive current generator 19 and a negative current generator 20, each connected to independent current sensor circuits 21 and 22, respectively. Both detectors 21 and 22 have pairs of output contacts 23, 24 and 25, 26, respectively, for transmission of signal pulses to a gas exhausting gun firing synchronizing and record system (not shown). Current sensor 21 comprises a voltage meter 27, and a resistor 28. A current sensor 22 similarly includes a voltage meter 29 and a resistor 30.

A gun switch 31 is connected between the independent current sensor circuits 21, 22 and the two electrodes 14, 15. Switch 31 comprises relay contacts 32 and 33 operated by relay 34, which relay is driven by relay driver 35 responsive to flip-flop clock 36. In normal operation electronic switch 37 connects flip-flop clock 36 to the digital field system time break enable pulse generator 38 which supplies power to relay driver 35 for energizing a relay 34 which operates switch 31 which switches the polarity of the current supplied to each of the electrodes.

If no shots are fired in a pre-selected period of time, then the T.B.E. (Time Break Enable) pulse generator sensing circuit 39 operates electronic switch 37 so that 40 can supply voltage pulses to the flip-flop clock 36 which causes the polarity of the current supplied to electrodes 14 and 15 to change during extended periods of time when no gas exhausting gun shots are being fired. Switch 37 may be switched electronically, or manually to either standby pulse generator 40 or D.F.S. IV (Digital Field System) T.B.E. pulse generator 38 for supplying the triggering pulses to flip-flop 36 which supplies the control voltage to relay driver 35 which in turn supplies the power to relay 34 which controls the polarity of the current signals supplied to electrodes 14 and 15.

METHOD FOR ASSEMBLING AND FORMING A GAS EXHAUSTING GUN FIRING DETECTION SYSTEM

While various methods may be used for assembling and forming the above described gas exhausting gun firing detection system or novel circuit 13, FIG. 1, the below described circuit is the new, novel, and preferred method for precisely indicating the moment of firing of a submerged gas exhausting gun 10 for a seismic record. Principal features of this method is that it reduces plating action on the two electrodes 14 and 15, it reduces cross coupling between channels, and it has in effect a third electrode or sea ground 16 when any one of the other two electrodes becomes defective forming a fail-safe system.

The basic method for assembling and forming a fail-safe gas exhausting gun firing detection system or circuit (13) comprises:

(1) forming a firing detection circuit means (13) including two spaced apart electrodes (14, 15) submerged underwater very close to the gas exhausting gun exhaust port (12a), (2) connecting a polarity reversing circuit means (31, 32, 33, 34, 35) in series in said firing detection circuit means, (3) connecting said firing detection circuit means (37, 39, 40) responsive to said polarity reversing circuit means for periodically reversing the current to said two electrodes after a predetermined period of time for providing the fail-safe gas exhausting gun firing detection system having reduced plating action on the electrodes and having reduced cross coupling between other channels.

The third method step above may include the following method steps:

(1) interconnecting with the polarity reversing circuit means two switches (32, 33) in series in the circuit between the two electrodes and interconnecting two independent current sensor circuits (21, 22) in series in the firing detection circuit (13), (2) connecting positive and negative current generators (19, 20) between the independent current sensor circuits (21, 22) and a sea ground (16) for reducing plating action of the currents on the electrodes (14, 15).

Further, the third method step above may include the following method steps:

(1) forming a low inter-electrode resistance by connecting in the firing detection circuit (13) in series the two submerged electrodes (14, 15) in the circuit separated by water, (2) connecting in the firing detection circuit in series switch means (31, 32, 33) for switching current from one electrode to the other electrode, (3) connecting polarity reversing current generator circuit means (31, 32, 33, 34, 35, 36, 37) in the firing detection circuit means in series between the two electrodes (14, 15) and a sea ground (16) so that the sea ground becomes a third electron source, (4) connecting the polarity reversing current generator circuit means (31-37) in the firing detection circuit (13) to ensure that the electrodes are responsive to the polarity reversing current generator circuit means for receiving current flow from the sea ground (16) to the negative electrode (14 or 15) when said positive electrode (14 or 15) is defective and for receiving current flow from the sea ground to the positive electrode when said negative electrode is defective.

The above basic method may include the following method step:

(1) connecting an independent current sensor circuit monitoring means (21 or 22) in the firing detection circuit (13) in series and responsive to the two submerged electrode means (14, 15) for generating upon firing of the gas exhausting gun (10) and the exhaust gases have blown away and replaced at least a portion of the water between the submerged electrodes momentarily, a high interelectrode resistance for signaling the precise moment of firing of the gas exhausing gun for the seismic record.

METHOD FOR DETECTING FIRING OF A GAS EXHAUSTING GUN

The second invention comprises a method for detecting a pulse indicating the precise moment of firing of a submerged gas exhausting gun 10, FIG. 1, for a seismic record. Features of this method are that it reduces plating action on the two electrodes 14 and 15, it reduces cross coupling between channels, and it has in effect a third electrode or sea ground 16 so that when any one of the other two electrodes becomes defective, the sea ground will automatically act as a ground for thus forming a fail-safe system or circuit 13.

Thus a fail-safe method is set forth for detecting firing of a gas exhausting gun while reducing plating action on two closely spaced apart electrodes submerged underwater very close to the gas exhausting gun exhaust port comprising, (1) passing a current through the two electrodes (14, 15), (2) periodically reversing the current to the two electrodes responsive to a polarity reversing circuit means (31, 37, 39, 40) after a predetermined period of time.

The second step of the above method may be modified for forming another method:

(1) periodically reversing the current to the two electrodes (14, 15) responsive to a polarity reversing circuit (31, 37, 38) after each firing of the gas exhausting gun.

Another fail-safe method for generating a plurality of pulses indicating the precise moments of firing of a gas exhausting gun for a seismic record in a circuit including a current to two closely spaced apart electrodes submerged underwater very close to a gas exhausting gun exhaust port comprising, (1) utilizing a backup electrode (16) when any one of the two electrodes (14, 15) becomes defective by connecting a polarity reversing circuit means (31) to a sea ground (16), and (2) periodically reversing the current to the two electrodes after a predetermined period of time by causing the circuit to be responsive to the polarity reversing circuit means (31, 37, 39, 40) for reducing plating action on the electrodes, for reducing cross coupling between other channels, and for providing a fail-safe system.

A further method comprises modifying the second step of the above method to read:

(2) periodically reversing the current to the two electrodes after a predetermined period of time by causing the circuit to be responsive to a gang switch means (31, 32, 33) and a relay driven means (34, 35) for switching the electrodes between positive and negative current generator circuits.

Another method comprises modifying the above second step to read:

(2) monitoring the pulses in the circuit due to the momentary increase in resistance in the circuit between the two electrodes (14, 15) by causing two independent current sensor circuit (21, 22) means to be responsive to firing of the gas exhausting gun.

A still further method may comprise modifying the above second method step to read:

(2) generating a positive current to one of said electrodes and a negative current to the other of said electrodes, respectively by causing the circuit to be responsive to a positive current generator means (19) and a negative current generator means (20).

Thus, the results of the above methods for generating a pulse indicating the precise moment of firing of a gas exhausting gun and methods for assembling a fail-safe gas exhausting gun firing detection system are:

1. Less plating action on the electrodes.
2. Reduced noise and cross coupling between other channels due to equal and opposite polarity contents being supplied to the electrodes 14 and 15.
3. A more reliable fail-safe system due to the use of a third electrode or sea ground 16 is a backing electrode when any one of the two normal electrodes, 14 and 15, fail.

Accordingly, it will be seen that a fail-safe mechanism results for generating a pulse indicating the precise moment of firing of a gas exhausting gun, and that it will operate in a manner which meets each of the objects set forth hereinbefore.

While only a few methods for carrying out the invention have been disclosed, it will be evident that various modifications are possible in the foregoing disclosed methods without departing from the scope of the invention and it is accordingly desired to comprehend within the purview of this invention such modifications as may be considered to fall within the scope of the appended claims.

We claim:

1. A fail-safe method for detecting firing of a gas exhausting gun having two closely spaced apart electrodes submerged underwater very close to the gas exhausting gun exhaust port comprising,
   (a) passing a current to a sea ground as a backup electrode when any one of the two electrodes becomes defective for providing a fail-safe indicator.

2. A fail-safe method for detecting firing of a gas exhausting gun having two closely spaced apart electrodes submerged underwater very close to the gas exhausting gun exhaust port comprising,
   (a) passing a current through the two electrodes, and
   (b) utilizing a sea ground as a backup electrode when any one of the two electrodes becomes defective.

3. A fail-safe method for generating a plurality of pulses indicating the precise moments of firing of a gas exhausting gun for a seismic record in a circuit including two closely spaced apart electrodes submerged underwater very close to the gas exhausting gun exhaust port comprising,
   (a) utilizing a backup electrode when any one of the two electrodes becomes defective, by connecting a polarity reversing means to a sea ground, and
   (b) periodically reversing the current to the two electrodes after a predetermined period of time by causing the circuit to be responsive to the polarity reversing means for reducing plating action on the electrodes, for reducing cross coupling between other channels, and for providing a fail-safe system.

4. A method as recited in claim 3 wherein the second step comprises,
   (a) reversing the current to the two electrodes by causing the circuit to be responsive to the polarity reversing means when fired for reducing plating action on the electrodes.

5. A method as recited in claim 3 wherein the second method step comprises further,
   (a) periodically reversing the current to the two electrodes after a predetermined period of time by causing the circuit to be responsive to a gang switch means and a relay driven means for switching the electrodes between positive and negative current generator circuits.

6. A method as recited in claim 3 wherein the second method step comprises further,
   (a) monitoring the pulses in the circuit due to the momentary increase in resistance in the circuit between the two electrodes by causing two independent current sensor circuit means to be responsive to firing of the gas exhausting gun.

7. A circuit as recited in claim 3 wherein the second method step comprises further,
   (a) generating a positive current to one of said electrodes and a negative current to the other of said electrodes, respectively by causing the circuit to be responsive to a positive current generator means and a negative current generator means.

8. A method as recited in claim 3 wherein the second method step comprises further,
   (a) switching the two electrodes between positive and negative current generator circuits for causing a relay driven means to be responsive to a flip-flop clock for operating a gang switch.

9. A method as recited in claim 3 wherein the second method step comprises further,
   (a) counting and storing the exact time of passing of each firing of the gas exhausting gun by causing a flip-flop clock means to be responsive to a pulse generator means.

10. A method as recited in claim 3 wherein the second method step comprises further,
    (a) generating a signal pulse for reversing said current to the two electrodes with operation of a digital field system pulse generator means.

11. A method for assembling a fail-safe gas exhausting gun firing detection system comprising,
    (a) forming a firing detection circuit means including two spaced apart electrodes submerged underwater very close to the gas exhausting gun exhaust port,
    (b) connecting a sea ground in the circuit as a backup electrode when any one of the two electrodes fails,
    (c) connecting a polarity reversing means in said firing detection circuit means between the two electrodes, and
    (d) connecting said firing detection circuit means to be responsive to said polarity reversing means for periodically reversing the current to the two electrodes after a predetermined period of time for providing the fail-safe gas exhausting gun firing detection system having reduced plating action on the electrodes, having reduced cross coupling between other channels, and for providing a fail-safe gas exhausting gun firing detection system.

12. A method as recited in claim 11 wherein the second method step comprises further,
    (a) interconnecting with the polarity reversing circuit means two switches in series in the circuit between the two electrodes and interconnecting two independent current sensor circuits in series in the firing detection circuit, and (b) connecting positive and negative current generators between the independent current sensor circuits and the sea ground for reducing plating action of the currents on the electrodes.

13. A method as recited in claim 11 comprising further,
   (a) connecting an independent current sensor circuit monitoring means in the firing detection circuit in series and responsive to the two submerged electrode means for generating upon firing of the gas exhausting gun and the exhaust gases have blown away and replaced at least a portion of the water between the submerged electrodes momentarily, a high inter-electrode resistance for signalling the precise moment of firing of the gas exhausting gun for the seismic record.

14. A fail-safe method for detecting firing of a gas exhausting gun having a circuit for passing an electrical current between an electrical current source and two closely spaced apart electrodes submerged underwater very close to the gas exhausting gun exhaust port comprising,
   (a) flowing the electrical current through one electrode and a sea ground in the circuit when the other of the two electrodes fails.

* * * * *